United States Patent Office 3,516,288
Patented June 23, 1970

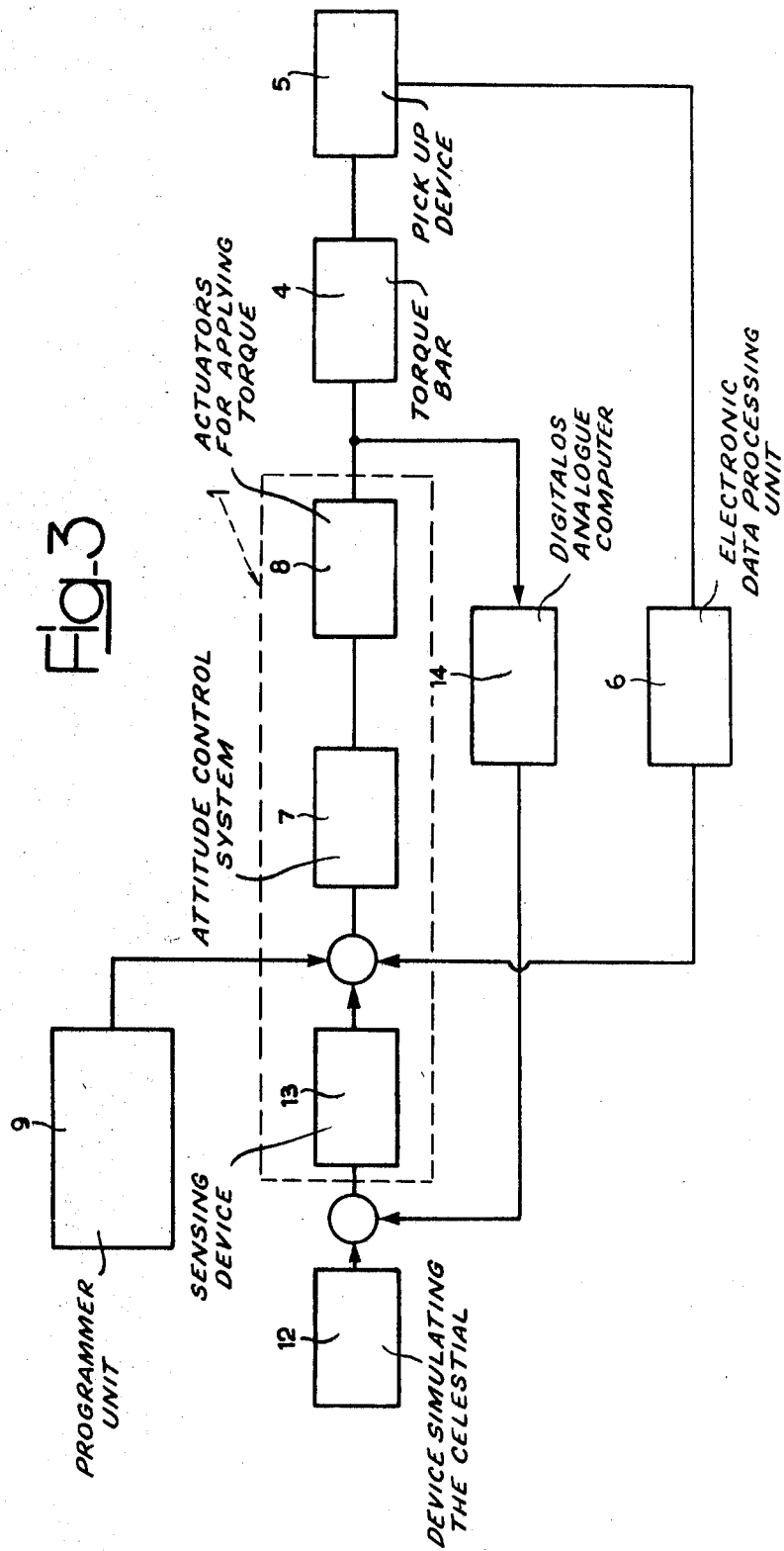

3,516,288
PROCESS AND APPARATUS FOR TESTING ON THE GROUND THE ORBITAL OPERATION OF THE APPARATUS CONTROLLING THE SETTING OF A SPACE VEHICLE
Francesco Gnavi, Turin, Italy, assignor to Fiat Societa per Azioni, Turin, Italy, a joint-stock company of Italy
Filed May 16, 1968, Ser. No. 731,361
Claims priority, application Italy, May 18, 1967, 51,769/67, Patent 803,952
Int. Cl. G01l 5/13
U.S. Cl. 73—117.1                     15 Claims

ABSTRACT OF THE DISCLOSURE

The attitude control system of a space vehicle is ground-tested by measuring the torque in a resilient link connecting the vehicle to the ground in response to command signals supplied to the vehicle actuators, and deriving from said torque the angular displacement which would result in flight without said link.

---

This invention relates to the ground-testing of the attitude control system of a space vehicle.

Such attitude control systems, upon receiving an input signal from a programmer or, alternatively, from a device responsive to the angular position of the vehicle, or simultaneously from both, control the attitude control actuators with which the vehicle is equipped to impart to the vehicle a torque for changing the vehicle attitude.

As is known, an initial reception test of the control system is carried out by the manufacturer on the component parts or on the entire system in order to check that the system operates correctly. It is, however, necessary to carry out further tests on the system installed in the space vehicle, by simulating as far as possible the events and conditions of flight.

The methods adopted heretofore for the ground-testing of the attitude control system of a space vehicle employ a test platform rotatable about three orthogonal axes, upon which the vehicle is mounted during testing.

Conventional test platforms are of two types, namely a platform freely rotatable about the three axes, and a platform which is rotated by control chains. The platform of the former type materially modifies by virtue of its mass distribution the dynamics of the vehicle and is therefore of a reduced usefulness. The platform of the latter type should necessarily be associated with a computer, separate from the vehicle, for operating the control chains. Such a platform therefore fails to simulate a movable member directly operated by the torques; moreover, the permitted angular displacements of this platform are limited, and this seriously impairs its usefulness.

With either of these test platforms, the associated equipment for carrying out the tests is complex, cumbersome and very expensive.

In order to obviate the above drawbacks the present invention provides a method of ground-testing the attitude control system of a space vehicle comprising the steps of connecting the vehicle to the ground through a resilient link, applying to attitude control actuators on the vehicle an input angular displacement command signal to impart torque to the vehicle, measuring the resulting torsional deformation of said link to provide signals representative of said torque, deriving from said latter signals the values of the angular displacement of the vehicle which would be caused in flight in the absence of said link by said torque, and comparing said derived angular displacement with the input command signal.

The vehicle under test may be supported entirely by the resilient link or at least part of the vehicle weight may be separately supported in order to provide a given torque-deformation ratio selected as a function of the responsiveness of the measuring system.

Fluid bearing means may be provided for supporting at least part of the vehicle weight.

Ground-testing in accordance with the invention may be carried out in a relatively simple and inexpensive manner, the absence of moving parts, reducing the space required, so that the testing may be effected in a test chamber of small size.

A closed feedback path for the computed attitude changes may be provided, excluding sensing devices responsive to the vehicle position, which do not generally modify the dynamic response of the test system by virtue of their rapid response.

Alternatively, said sensing devices may be included in a feed-back network to simulate relative movement of the vehicle and a celestial reference by effecting movement of a simulated reference utilising a computer responsive to signals provided by the attitude control actuators of the vehicle. With such an arrangement the dynamics of the entire system comprising the test apparatus and the vehicle are taken into account. This gives rise to the possibility of measuring the "dynamic accuracy" of the attitude control system, that is, the degree of error during transient periods. The dynamic accuracy is a direct measure of the essential performance which is required of the attitude control system of the vehicle.

The "dynamic accuracy" is acknowledged to be of a statistical nature, and cannot generally be predicted mathematically, as an analysis of all the disturbing torques acting on the vehicle or of the non-linearity of the vehicle movement parameters is generally difficult, even virtually impossible. It is therefore defined as a result of extended experimental observations effected possibly under orbital conditions.

The invention has the further advantage of being applicable to the testing of control systems for vehicles such as satellites of a complex nature, comprising a number of relatively movable parts.

The invention will be more clearly understood from the following description, given by way of example only, with reference to the accompanying drawings, wherein:

FIG. 3 is a schematic block diagram of test-apparatus according to a modified embodiment of the invention.

Figure 1:
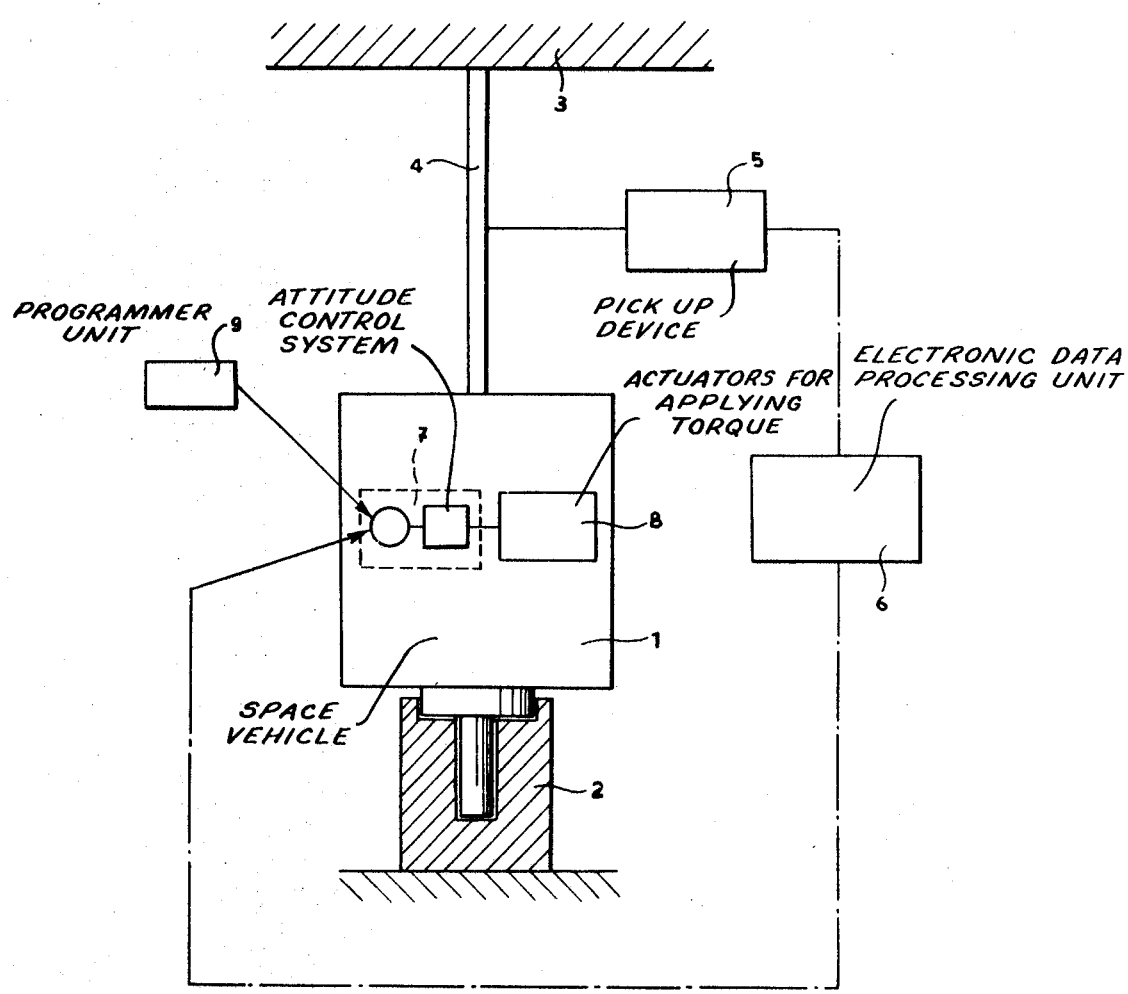
FIG. 1 is a diagrammatic side view of a space vehicle provided with apparatus for effecting ground-testing of its attitude control system by the method according to this invention.

Referring to FIG. 1, a space vehicle denoted generally by 1 is supported by a fluid bearing 2 which is mounted on the ground and which permits a single degree of rotational freedom of the vehicle 1, about a vertical axis. The bearing 2 exhibits very low friction when fluid under pressure is supplied to its surfaces.

The vehicle 1 is secured to a fixed reference 3, which is also attached to the ground, by means of a resilient link comprising a torque bar 4 arranged coaxially with the bearing 2. If desired, the bearing 2 may be dispensed with, and the torque bar 4 adapted to support the entire weight of the vehicle 1. Obviously, the torque bar 4 can be attached either to the top or the bottom of the vehicle 1.

In order to measure the torsional deformation of the torque bar 4, a pick-up device 5 is connected to the bar 4. The device 5 is suitably of the type employing a variation in the reluctance of a magnetic circuit to provide an electrical signal representative of the torsional deformation of the bar 4. The output of the pick-up device 5 is connected to the input of an electronic data processing unit 6.

The vehicle 1 under test is provided with an attitude control system, denoted by 7, which is associated with actuators 8 for applying torques to the vehicle 1 in order to control the attitude thereof. The control system 7 has respective inputs operatively connected with the electronic data processing unit 6 and with a programmer unit 9 for supplying angular displacement command input signals.

The programmer unit 9 supplies input command signals, generally in the form of electrical signals, to the control system 7 in order to control angular displacements of the vehicle 1 by way of the actuators 8 which supply a corresponding torque to vehicle 1, the torque in the embodiment of FIG. 1 being about a vertical axis. This torque is resiliently opposed by the bar 4, which is deformed torsionally.

The torsional deformation of the bar 4 is converted by the pick-up device 5 into an electrical signal which is fed into the electronic data processing unit 6. The unit 6 includes digital and analogue computers which process said signals from the pick-up device 5 to calculate the applied torque and, on the basis of the components of this torque, also calculate with a known degree of accuracy the angular displacement which would be undergone by the vehicle 1 were this torque applied in the absence of the torque bar 4, that is the angular displacement which would occur, to a known approximation, in free or obital flight of the vehicle 1.

The resulting angular displacement may be derived in various ways, for example by arranging that the product of the transfer function of the ground-supported vehicle 1 under test with an appropriate compensation function and further with the transfer function of the vehicle 1 in free orbit is equal to the transfer function expressing the motion of the vehicle 1 in orbit under the effect of the applied torques. Alternatively, it may be arranged that the product of the transfer function of the ground-linked vehicle 1 with the transfer function set in the processing unit 6 approximates to the transfer function of the vehicle 1 in orbit.

The data processing unit 6 sends an electrical signal representing the calculated angular displacement to the attitude control system 7 where this signal is compared with the command signal from the programmer unit 9. This comparison is effected by subtracting continuously the derived angular displacement signals from the command signals to produce difference signals which are processed by attitude control system 7 and recorded as a succession of error signals on a recording device (not shown).

The derivation from the measured torsional deformations of the bar 4 of the applied torques and of the consequent angular displacement which such torques would produce in flight is effected, as mentioned above, by means of digital and analogue computers which operate in real or actual time.

In FIG. 1 the fluid bearing 2 has one degree of freedom in supporting the weight of the space vehicle 1, this degree of freedom being rotation about the vertical axis common to the bearing 2 and the bar 4.

Figure 2:
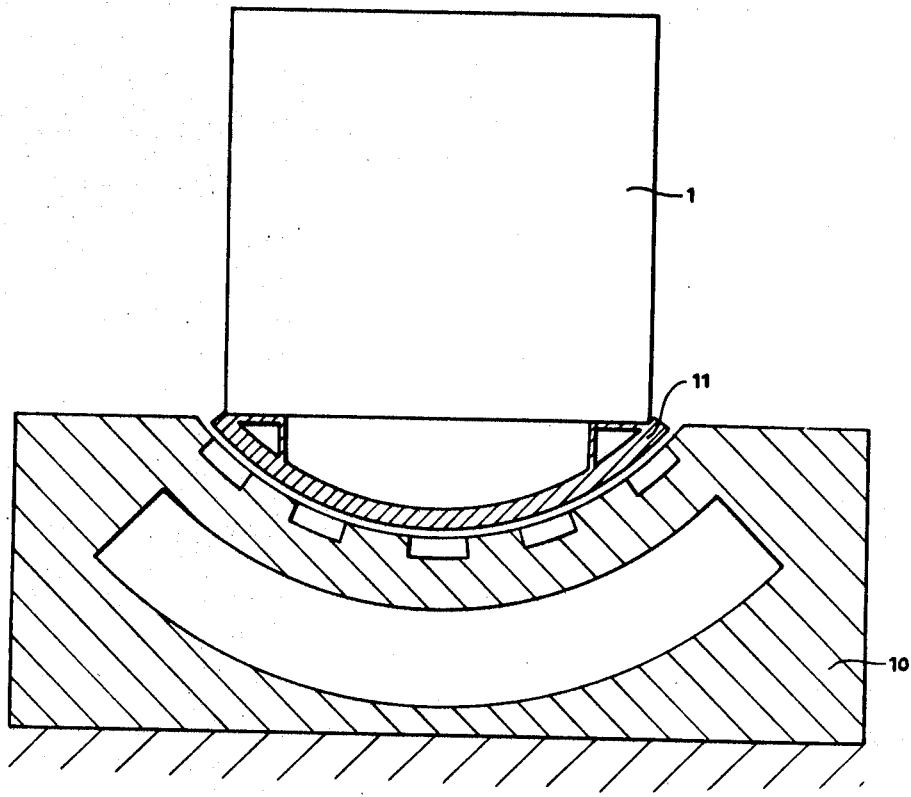
FIG. 2 is a part-sectional diagrammatic side view of a supporting fluid bearing having three degrees of freedom for use in connection with the test-apparatus of FIG. 1.

FIG. 2 shows an alternative form of fluid bearing having three degrees of freedom for supporting the vehicle 1 for rotation about three mutually perpendicular axes. This bearing comprises a stationary portion 10 having an upper concave spherical surface and a movable portion 11 having a lower convex spherical surface matching the spherical surface of the stationary portion 10, the movable portion 11 being supported on the stationary portion 10.

The movable portion 11 is so weighted that its center of gravity coincides witih the center of curvature of the complementary spherical surfaces of the bearing portions 10, 11.

A pressure fluid, such as oil, is injected between the complementary spherical surfaces of the stationary and movable portions 10, 11 and prevents a sliding contact of these surfaces, so that the movable portion 11 is effectively supported from the stationary portion 10 upon a fluid cushion.

The pick-up device 5 and the data processing unit 6 together constitute a feedback path for the command signals supplied by the programmer unit 9. In the example shown in FIG. 1 this path forms a closed loop at the control system 7 and thereby cuts out the sensing devices which, in operation of the vehicle, are responsive to the instantaneous location of the vehicle with respect to a celestial reference.

As is well known, these sensing devices have rapid response, and the fact that these devices are cut out from the feedback loop does not generally modify the dynamic response of the system. It is, however, possible according to the invention to provide a feedback network including the above mentioned sensing devices.

This is effected in a modified embodiment of the invention by mechanically moving references which simulate on the ground the celestial references, to simulate relative movement of the vehicle and the celestial reference. This system is applicable particularly to a satellite space vehicle.

FIG. 3 shows this modified embodiment in block schematic form, the components of the apparatus which are common to that of FIG. 1 being denoted by the same reference numerals.

In FIG. 3, 12 denotes a device simulating the celestial reference. The vehicle 1, which is indicated in broken outline, carries a sensing device 13 which is responsive to instantaneous position of the vehicle relative to the reference.

The sensing device 13 is operatively connected with the attitude control system 7 of the vehicle 1 and transmits to this system in a known manner control signals related to the variations in the vehicle attitude with respect to the simulated celestial reference.

The reference-simulating device 12 is moreover operatively connected with a digital or analogue computer 14 which processes the electrical control signals from the attitude control actuators 8 and which transmits to the device 12 electrical signals which move the reference device 12 mechanically to simulate the movement of the vehicle 1 relative to the celestial reference which the actuators 8 would cause in flight of the vehicle.

I claim:

1. Method of ground testing the attitude control system of a space vehicle having attitude control actuators, the method comprising the steps of: connecting the vehicle to the ground through a resilient link; applying to the attitude control actuators of the vehicle an input angular displacement command signal to impart torque to the vehicle; measuring the resulting torsional deformation of said link to provide signals representative of said torque; deriving from said latter signals output signals corresponding to the values of the angular displacement of the vehicle which would be caused by said torque in flight of the vehicle in the absence of said link, and comparing said derived angular displacement with the input command signal.

2. Method as claimed in claim 1, wherein the resilient link supports the entire weight of the vehicle.

3. Method as claimed in claim 1, wherein the weight of the vehicle is supported from the ground by fluid bearing means permitting rotation of the vehicle about at least one axis passing through the centre of gravity of the vehicle.

4. Method as claimed in claim 1, including the steps of providing a variable reference signal, representative of the relative position of celestial reference, to simulate movement of the vehicle relative to said reference, and controlling variation of said reference signal by processing signals passed to the vehicle attitude control actuators.

5. Method as claimed in claim 4, wherein variation of the said celestial reference is effected as a mechanical movement in response to electrical signals.

6. Method as claimed in claim 1, further including the step of providing a programmed signal for the input command signal.

7. Method as claimed in claim 1, further including the step of generating the input command signal from means responsive to the vehicle position relative to a datum.

8. Method as claimed in claim 1, further including the step of providing electrical signals as the input signals and the output signals; comparing the signals by subtracting one signal from the other signal and continuously recording the resulting difference signal.

9. Method as in claim 1, further including applying compensation functions to the signals corresponding to said torque to provide the output signals corresponding to the values of the angular displacement of the vehicle in flight.

10. Apparatus for use in ground-testing of the attitude control system of a space vehicle having an attitude control system, said apparatus comprising:
 (a) a resilient link connecting the vehicle to the ground;
 (b) pick-up means connected to said link and effective in response to torsional deformation of the link under torque to provide signals representative of said torque;
 (c) a computer device operative to derive from said torque-representative signals output signals representative of the angular displacement which said torque would effect on the vehicle in flight;
 (d) a programmer providing angular displacement command signals; and
 (e) comparator means comparing said output signals with said command signals.

11. Apparatus as claimed in claim 10, including bearing means supporting at least part of the weight of the vehicle under test, said bearing means comprising:
 (a) a fixed portion mounted on the ground;
 (b) a movable portion supported on the fixed portion;
 (c) respective complementary spherical bearing surfaces on said fixed and movable portions; and
 (d) means mounting a space vehicle under test on the movable portion so that the center of gravity of said vehicle substantially coincides with the center of curvature of said spherical bearing surfaces.

12. Apparatus as claimed in claim 11, including means injecting fluid under pressure between said complementary spherical bearing surfaces to support the movable portion from the fixed portion through a fluid cushion.

13. Apparatus for ground testing the attitude control system of a space vehicle having attitude control actuators comprising a support; a resilient link connecting the vehicle to the support; means for applying to the attitude control actuators of the vehicle an input angular displacement command signal to operate the control actuators and create a torque on the link; means for measuring the torsional deformation of the link and providing signals representative of the torque; means for deriving from the torque signals output signals corresponding to the values of the angular displacement of the vehicle which would be caused by the torque during the flight of the vehicle in absence of the link, and means for comparing the derived output signals with the input command signal.

14. Apparatus as in claim 13, which further includes means for recording the comparison of the derived output signal and the input command signal.

15. Apparatus as claimed in claim 13, wherein the derivation of the torque-representative signals from the resilient deformation of the link, and the derivation of the values of said consequent angular displacement due to said torque, is effected by computers operating in real time, said computers effecting compensations for dynamic and static errors introduced by the control system as a whole.

References Cited

UNITED STATES PATENTS

| | | |
|---|---|---|
| 2,865,200 | 12/1958 | Gieseler. |
| 3,015,231 | 1/1962 | Ganahl _____ 73—117.1 |
| 3,139,750 | 7/1964 | Smith et al. |
| 3,295,366 | 1/1967 | Von Pragenau et al. |

JERRY W. MYRACLE, Primary Examiner

U.S. Cl. X.R.

73—136